United States Patent [19]

Kanto et al.

[11] Patent Number: 5,068,282

[45] Date of Patent: Nov. 26, 1991

[54] PROCESS FOR PRODUCING A POLYVINYL ACETACETAL RESIN FOR USE IN A HEAT TRANSFER SHEET

[75] Inventors: Jumpei Kanto, Komae; Masanori Akada; Katsuhiro Kamakari, both of Tokyo; Kenichi Asahina; Katsuaki Sakashita, both of Shiga; Yoshihisa Watanabe, Uji, all of Japan

[73] Assignees: Dai Nippon Insatsu Kabushiki Kaisha, Japan; Sekisui Kagaku Kogyo Kabushiki Kaisha, Japan

[21] Appl. No.: 428,619

[22] Filed: Oct. 30, 1989

Related U.S. Application Data

[62] Division of Ser. No. 132,001, Dec. 11, 1987, Pat. No. 4,902,670.

[30] Foreign Application Priority Data

Dec. 15, 1986 [JP] Japan .............................. 61-298505
Feb. 27, 1987 [JP] Japan .............................. 62-45463

[51] Int. Cl.$^5$ .............................................. C08F 8/00
[52] U.S. Cl. ........................................ 525/61; 525/56
[58] Field of Search ................................................ 525/61

[56] References Cited

U.S. PATENT DOCUMENTS 4,533,697  8/1985  Degeili .................................. 525/61
4,541,830  9/1985  Hotta et al. ............................ 8/471
4,614,521  9/1986  Niwa et al. ............................ 8/471

FOREIGN PATENT DOCUMENTS 2007677  5/1979  United Kingdom .

Primary Examiner—Joseph L. Schofer
Assistant Examiner—J. M. Reddick
Attorney, Agent, or Firm—Parkhurst, Wendel & Rossi

[57] ABSTRACT

A heat transfer sheet comprises a substrate sheet and a heat transfer layer laminated on the substrate sheet and containing a dye which can be caused to migrate by heating to be transferred onto a transferable sheet, said heat transfer sheet containing a polyvinyl acetacetal resin as a binder component, the acetal moiety of said polyvinyl acetacetal resin being 50% by weight or more based on the total amount of the resin, and 80% by weight or more of said acetal moiety comprising polyvinyl acetacetal.

A process for producing a polyvinyl acetacetal resin by the reaction of a polyvinyl alcohol and acetaldehyde in an aqueous phase in the presence of 4 to 10% by weight of an acid catalyst comprises initiating precipitation of an acetalated product by maintaining the reaction system at a temperature of 8° to 17° C. for 30 minutes or longer, and then maintaining said reaction at a temperature of 25° to 40° C.

6 Claims, 1 Drawing Sheet

PROCESS FOR PRODUCING A POLYVINYL ACETACETAL RESIN FOR USE IN A HEAT TRANSFER SHEET

This is a division of application Ser. No. 07/132,001 filed Dec. 11, 1987, now U.S. Pat. No. 4,902,670.

BACKGROUND OF THE INVENTION

This invention relates to a heat transfer sheet, and more particularly to a heat transfer sheet which is particularly suitable for obtaining an image on a heat transferable sheet by carrying out heating printing corresponding to image information by a thermal head or laser.

Further, the present invention relates to a process for producing a polyvinyl acetacetal resin, particularly to a process for producing a polyvinyl acetacetal resin of high acetalation degree and little irregularity of particle size.

For obtaining an image corresponding to an information image by the use of a heating printing means such as thermal head or laser, heat-sensitive color forming has been primarily used in the prior art. In such heat-sensitive color forming paper, a leuco dye which is colorless or pale yellow at room temperature provided on a substrate paper and a developer are brought into contact by heating to give a color formed image. As such developers, phenolic compounds, zinc salicylate derivative, rosin, etc. have been generally employed. However, a heat-sensitive color forming paper has a serious defect of color extinction when the color formed image is stored for a long term, and color printing is limited to two colors and cannot give a color image having continuous gradation.

On the other hand, a heat-sensitive transfer paper having a heat-fusible wax layer comprising a pigment dispersed therein and provided on a substrate paper has begun to be used in recent years. When the heat-sensitive transfer paper is superposed on a heat transferable paper and heating printing is carried out on the back surface of the heat-sensitive transfer paper, the wax layer containing the pigment migrates onto the transferable paper to produce an image thereon. According to such a printing method, by performing printing a plural number of times by the use of a heat-sensitive transfer paper containing pigments of three primary colors, a multi-color image can be obtained, but it has been impossible to obtain a photograph-like image having essentially continuous gradation.

In recent years, there has been an increasing demand for a technique to obtain photograph-like images directly from electrical signals, and various attempts have been made. One of such attempts is a method in which an image is formed on CRT, and this is photographed with a silver salt film. However, when the silver salt film is an instant film, there is a drawback in that running cost becomes high, while, when the silver salt film is a 35 mm film, there is the drawback of lack of instancy because a developing processing is required after photographing. As still another method, the impact ribbon method or the ink jet method has been also proposed. However, the former involves the drawback of bad image quality, and the latter a drawback in that image cannot be obtained as simply as photography because image processing is required.

For solving such problems, there has been proposed a method in which a heat transfer sheet having a sublimatable disperse dye layer having the property of migration by heating provided thereon is used in combination with a heat transferable sheet, and the sublimatable dye is caused to migrate under control onto the heat-transferable sheet, thereby obtaining an image having gradation like a photograph (Journal of Image Electronic Society, Vol. 12, No. 1, 1983). According to this method, an image with continuous gradation can be obtained by simple processing from television signals, and yet the device used thereby is not complicated, whereby this method is now attracting attention.

As one of the prior art techniques approximating this method, the dry transfer printing method of polyester fibers may be mentioned. This method is a method for obtaining an image, which comprises dispersing or dissolving a dye such as a sublimatable disperse dye, etc., in a synthetic resin solution to prepare a coating material, applying the coating material in a pattern on a thin paper or like material, drying to form a heat transfer sheet, superposing the heat transfer sheet onto a polyester fiber which is the heat transferable sheet, and heating the composite under adhesion, thereby applying the disperse dye onto the polyester fiber. However, even when the heat transfer sheet used in the prior art for the dry transfer printing method of polyester fibers is used as it is, and heating printing is carried out by a thermal head or the like, it is difficult to obtain a color formed image with high density. The reason for this may be the fact that the heat-sensitivity of the heat transfer sheet is not high, and the dyeing ability of the heat transferable sheet is low.

Of these drawbacks, those caused by the heat transferable sheet were found to be solved by a heat transferable sheet having a heat transferable layer comprising the island portions independent of each other comprising a synthetic resin having a glass transition temperature of $-100°$ C. to $20°$ C. and a polar group and a sea portion comprising a synthetic resin having a glass transition temperature of $40°$ C. or higher formed as an island-sea configuration (Japanese Patent Application No. 135627/1983), but those caused by the heat transfer sheet have not yet been solved. This is because, in the method of printing onto fibers, etc., migration and transfer of the dye are accomplished by heating, for example, at $200°$ C. for about 1 minute, while heating with a thermal head is as short as several msec. at about $400°$ C.

We have carried out various studies to obtain a heat transfer sheet which can be suitably used in combination with a heat transferable sheet, particularly a heat transferable sheet of Japanese Patent Application No. 135627/1983 as mentioned above, in order to obtain an image of color photographic tone by heating printing with a thermal head, etc., and consequently found the following facts.

In the heat transfer sheet generally used in the prior art, the disperse dye exists in a state wherein it is dispered as particles in a binder, and for sublimating the dye molecules under such a state by heating, heat energy breaking the interactions within the crystals and further surpassing the interaction with the binder must be imparted to the dye molecules to accomplish sublimation and dyeing thereof onto the heat transferable sheet, whereby high energy is required. Also, in the case where, in order to obtain a colored image with high density, the dye is contained in the binder resin at a high relative ratio, an image with a somewhat high density can be obtained. However, because of the weakened bonding force in the heat transfer layer in the heat transfer sheet, when it is peeled off after printing with a thermal head with a heat transferable sheet superposed thereon, a phenomenon wherein the transfer layer is taken over together with the resin onto the heat transferable sheet is liable to occur. Further, since the dyes are of high cost, it is also disadvantageous to incorporate more dyes than necessary from the standpoint of such intended purposes as OA instruments or home uses.

On the other hand, if it is possible to maintain dyes in a binder in molecular dispersed form instead of particulate form, improvement of heat sensitivity corresponding to the absence of the interaction within the crystals as in the case of particulate dispersion may be expected. However, even when such a state is merely attained within a binder, a practically useful transfer paper cannot be obtained. More specifically, thermally sublimatable dye molecules have relatively smaller molecular weights of about 150 to 550 and are mobile in the binder. Accordingly, for example, when a binder with a low glass transition temperature (Tg) is employed, there occurs the phenomenon wherein agglomeration occurs with elapse of time to cause precipitation, resulting ultimately in the state of the dyes being dispersed in particulate form as described above, or due to bleeding onto the surface of the heat transfer layer, the dyes adhere also around the heating portion by the pressure between the thermal head and the platen (pressurizing plate) during recording, whereby ground staining is generated to cause serious deterioration of the image quality.

Also, even if the glass transition temperature (Tg) of the binder is high, the dye molecules cannot be retained unless the molecular weight of the binder is large to some extent. Further, even when the dye is dissolved in molecular state in a binder with a high glass transition temperature (Tg) and somewhat large molecular weight, affinity between the dye molecules and the binder is required in order to attain a state which is stable with time.

In view of such points, various heat transfer sheets intended to improve image quality have been proposed. For example, as described in Japanese Laid-Open Patent Publication No. 101087/1985, it has been known to obtain improvement of printing quality and stability with time by the use of a specific polyvinyl butyral resin as the binder component in the ink composition. However, these heat transfer sheets of the prior art are not necessarily amply satisfactory with respect to storability.

Generally speaking, as the conditions demanded for heat transfer sheet, storability of the heat transfer sheet itself is important along with various characteristics participating in image quality such as printing sensitivity and resolution. However, printing sensitivity and storability greatly tend to cancel each other, and it is difficult to improve both of these characteristics.

SUMMARY OF THE INVENTION

An object of the present invention, which has been accomplished in view of the points as described above, is to provide a heat transfer sheet which is dramatically improved in storability without a lowering of its printing quality.

Another object of the present invention is to provide a process for producing a polyvinyl acetal resin, herein specifically called "polyvinyl acetacetal" resin having excellent characteristics as a heat-resistant resin which is suitable, for example, as the binder component to be added in the ink composition for the heat transfer sheet of the invention.

The heat transfer sheet according to the present invention comprises a heat transfer layer containing a dye which is caused to migrate by heating to be transferred onto a transfer receptor or transferable sheet laminated on a substrate sheet, the heat transfer sheet containing a polyvinyl acetacetal resin as the binder component. Further, it is preferable that the acetal moiety of the polyvinyl acetacetal resin be 50% by weight or more based on the total amount of the polymer, and yet 80% by weight or more of said acetal moiety should comprise polyvinyl acetacetal. Also, the dye to be used is preferably a disperse dye and is preferably in substantially dissolved state in the binder.

Furthermore, the present invention provides a process for producing a polyvinyl acetacetal resin by a reaction of a polyvinyl alcohol and acetaldehyde in an aqueous phase in the presence of 4 to 10% by weight of an acid catalyst, the polyvinyl acetacetal being highly suitable for use as a binder component to be added in the ink composition for the heat transfer sheet of the invention. This process comprises initiating precipitation of acetalated product by maintaining the reaction system at 8° to 17° C. for 30 minutes or longer, and then maintaining said reaction at a temperature of 25° to 40° C.

DETAILED DESCRIPTION OF THE INVENTION

(I) Heat Transfer Sheet

Figure 1:
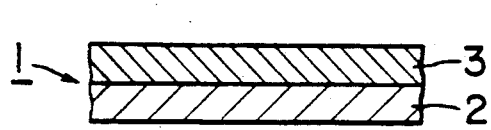
FIGS. 1 and 2 are fragmentary sectional views of examples of the heat transfer sheet according to this invention.

The heat transfer sheet according to the present invention is constituted of a heat transfer layer 3 provided on a substrate sheet 2 as shown in FIG. 1.

Substrate Sheet

For the substrate sheet 2 to be used in the present invention, papers or films such as capacitor paper, polyester film, polystyrene film, polysulfone film, polyimide film, polyvinyl alcohol film, cellophane, aramide film, polyetherimide film, polyether ether ketone film, polybarbatic acid, etc., are used, and its thickness is 1.5 to 50 μm, preferably 2 to 9 μm. Among these papers or films, when low cost and heat resistance under untreated state are required, capacitor paper is employed. On the other hand, when handling during preparation or running in a thermal printer without breaking due to its high mechanical strength or surface smoothness is regarded as more important, a polyester film is preferably used.

Heat Transfer Layer

The heat transfer layer 3 comprises primarily a dye and a binder.

The dye is melted, diffused or sublimated by heat to be migratable. Particularly a disperse dye is preferably employed. These dyes have molecular weights of about 150 to 550, and are selected with consideration of the sublimation (melting) temperature, hue, light resistance, solubility in ink and binder resin. In general, diarylmethane type, triarylmethane type, thizole type, methine type, azomethine type, xanthine type, oxazine type, thiazine type, azine type, acridine type, azo type, spirodipyrane type, indolinospiropyrane type, fluorane type, rhodaminelactam type, anthraquinone type, etc., are representative dyes. More specifically, the following dyes are preferable.

C.I. (Color Index) disperse yellow 51, 3, 54, 79, 23, 7, 141, 201;

C.I. disperse blue 24, 56, 14, 301, 334, 165, 19, 72, 87, 287, 154, 26;

C.I. disperse red 135, 146, 59, 1, 73, 60, 167;

C.I. disperse violet 4, 13, 26, 36, 56, 31;

C.I. solvent violet 13; CI. solvent black 3; C.I. solvent green 3;

C.I. solvent yellow 56, 14, 16, 29;

C.I. solvent blue 70, 35, 63, 36, 50, 49, 111, 105, 97, 11;

C.I. solvent red 135, 81, 18, 25, 19, 23, 24, 143, 146.

Specific examples are methine (cyanine) type basic dyes of monomethine type, dimethine type, and trimethine type, such as 3,3'-diethyloxathiacyanine iodide, Astrazone Pink FG (produced by Bayer Co., C.I. 48015), 2,2'-carbocyanine (C.I. 808), Astrafiloxine (C.I. 48070), Astrazone Yellow 7GLL (C.I. basic yellow 21), Aizen Catilon yellow 7GLL (produced by Hodogaya Kagaku, C.I. 48055), and Eizen Catilon Red 6BH (C.I. 48020); diphenylmethane type basic dyes such as Auramine (C.I. 655); triphenylmethane type basic dyes such as Malachite Green (C.I. 42000), Brilliant Green (C.I. 42040), Magenta (C.I. 42510), Methyl Violet (C.I. 42535), Crystal Violet (C.I. 42555), Methyl Green (C.I. 684), and Victoril Blue B (C.I. 44045); xanthene type basic dyes such as Bilonin G (C.I. 739), Rhodamine B (C.I. 45170), and Rhodamine 6G (C.I. 45160); acridine type basic dyes such as Acridine Yellow G (C.I. 785), Leonin Al (C.I. 46075), Benzoflavin (C.I. 791), and Afin (C.I. 46045); quinoneimine type basic dyes such as Neutral Red (C.I. 50040), Asthrazone Blue BGE/x125% (C.I. 51005), and Methylene Blue (C.I. 52015); and otherwise anthraquinone type basic dyes having quaternary amine. These dyes can be used in the forms as they are or in the forms obtained by subjecting these dyes to alkali treatment, or alternatively counter-ion exchanged derivatives or leuco derivatives of these dyes can be also used. When a leuco dye, etc. which is colorless or pale colored under normal state is used, a developer is included in the transferable sheet.

Also, it is important that the dye be substantially dissolved in the binder resin.

A specific feature of the present invention is the use of a specific polyvinyl acetacetal resin as the binder resin. This polyvinyl acetacetal resin can be obtained by acetalation of a polyvinyl alcohol and can be represented generally by the following repeating unit formula.

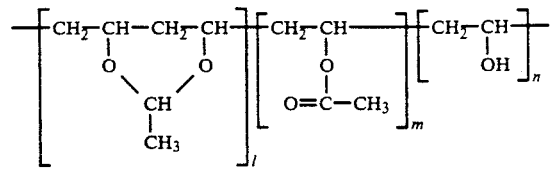

When a polyvinyl alcohol (PVA) is subjected to acetalation, as shown in the above formula, it is difficult to achieve complete acetalation of the PVA, and acetyl groups or hydroxyl groups will inevitably remain partially. As a result of our study, it has been clarified that resins having an acetalated moiety within a specific quantitative range are particularly excellent in both storability and printing characteristics. More specifically, the polyvinyl acetacetal resin as the binder resin should have 50% or more, preferably 62% or more, more preferably 70% or more of the acetal moiety based on the total amount of the polymer, and yet 80% by weight or more, preferably 90% by weight or more of the acetal moiety should be polyvinyl acetacetal, for improvement of storability as well as printing characteristics.

If the above polyvinyl acetacetal resin has less than 50% by weight of acetal moiety based on the total amount of the polymer, or (and) the amount of said acetal moiety in excess of 20% by weight comprise other components than polyvinyl acetacetal, solubility in a solvent which can dissolve well dyes such as toluene and MEK is lowered, whereby ink formation may become impossible in some cases. Also, since the glass transition temperature correlated intimately with storability of heat transfer sheet is low, the printing density after storage is also lower, whereby there is also the drawback that precipitation of the dye may be observed.

As the aldehyde to be used in the acetalation reaction in obtaining the resin as described above, acetaldehyde is generally employed, but for the purpose of improving affinity of the substrate sheet for the binder resin or solubility of the binder resin in the solvent or reducing the residual solvent, other aldehydes may be also used in an amount of 20% or less in terms of weight ratio at the acetalated portion. Examples of the aldehydes used for such purpose are formaldehyde, propionaldehyde, butylaldehyde, hexylaldehyde, 2-ethylhexylaldehyde, and the like, but the present invention is not limited to these.

Further, the amount of the acetyl groups remaining in the polyvinyl acetacetal resin has no essential influence on the accomplishing of the objects of the present invention but it can be selected as desired within the scope of the present invention as described above.

On the other hand, the molecular weight of the polyvinyl acetacetal resin can be suitably selected for the purpose of improving various characteristics. For example, for the purpose of controlling the viscosity of the dye or improving the printing adequacy, resins obtained from polyvinyl alcohols with different polymerization degrees by performing separately acetalation reactions respectively may be mixed, and also a mixture of polyvinyl alcohols with different polymerization degrees at the stage of the starting material may be used.

The proportion of the dye to be contained in the heat transfer layer, which may also depend on the sublimation (melting) temperature of the dye and the magnitude of covering power under the color formed state, is preferably 0.3 or more in terms of the weight ratio of the dye relative to the above binder (dye/binder ratio), more preferably 0.3 to 3.0, most preferably 0.55 to 2.5. If the dye/binder ratio is less than 0.3, it is not desirable in image quality such as printing density and heat sensitivity. On the other hand, with a ratio over 3.0, adhesion to the film and storability tend to be lowered.

Also, the binder resin may be also substituted by a cellulose type resin up to 10% by weight of the binder resin in the sense of improving the drying characteristic when forming the heat transfer layer by coating. Examples of the cellulose type resin are ethyl cellulose, hydroxyethyl cellulose, ethylhydroxy cellulose, ethylhydroxyethyl cellulose, hydroxypropyl cellulose, nitrocellulose and the like.

For providing the heat transfer layer on the substrate 2, a dye and a binder are dissolved together with a solvent to provide an ink composition for formation of the heat transfer layer, and this is provided on a substrate 2 by a suitable printing method or coating method. If necessary, any desired additive may be added in the ink composition for formation of the heat transfer layer.

Figure 2:
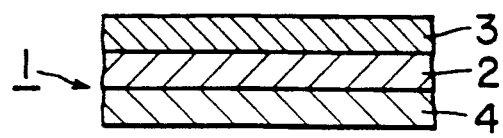

The heat transfer sheet is basically constituted as described above, but when the surface of the substrate sheet is directly heated with a contact type heating means such as a thermal head, as shown in FIG. 2, by providing a lubricating layer 4 containing a lubricant or a mold release agent such as wax on the side of the support 2 where no heat transfer layer is provided, fusion between the heating means such as a thermal head and the substrate can be prevented, and also slidability can be improved.

The heat transfer sheet may be in the form of sheets cut into desired dimensions, or in a continuous or wind-up shape, or further in shape of a tape with narrower width.

Figure 3:
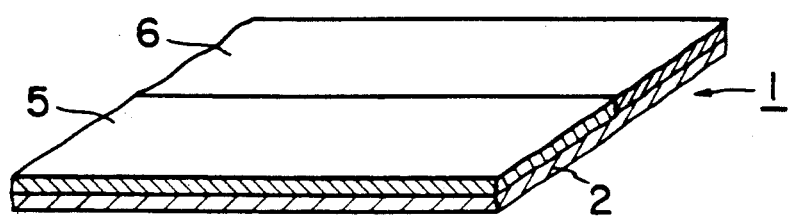
FIGS. 3 and 4 are perspective views of examples of the heat transfer sheet of the invention.

In providing the heat transfer layer 3 on the substrate sheet 2, a coating composition for heat transfer layer containing the same colorant may be coated onto the whole surface of the substrate 2, but in some cases, a plurality of ink compositions for heat transfer containing different colorants may be formed respectively on the different areas on the surface of the substrate sheet, respectively. For example, a heat transfer sheet having a black heat transfer layer 5 and a red heat transfer layer 6 laminated in parallel on the substrate as shown in FIG. 3, or a heat transfer sheet having a yellow heat transfer layer 7, a red heat transfer layer 8, a blue heat transfer layer 9 and a black heat transfer layer 10 provided repeatedly on the substrate sheet 2 can be used. By the use of a heat transfer sheet provided with plural heat transfer layers with different hues, a multi-color image can be advantageously obtained with one heat transfer sheet.

On the transfer sheet perforations can also be formed or discrimination marks can be provided for detecting the positions of the areas with different hues for the purpose of convenience during usage.

Heat Transfer Method

The heat transfer sheet and the heat transferable sheet as prepared above are so superposed that the heat transfer layer 3 on the heat transfer sheet 1 will contact the receiving layer 13 on the substrate sheet 12 of the heat transferable sheet, and by imparting heat energy corresponding to the image information to the interface between the heat transfer layer and the receiving layer, the dye in the heat transfer layer migrates to the receiving layer.

As the heat source for applying heat energy, other than the thermal head 14, known heat sources such as a laser beam, IR-ray flash, and thermal pen can be used. As the method for applying heat energy, it may be applied from the heat transfer sheet side, or otherwise from the heat transferable sheet side, or both sides, but it is preferably applied from the heat transfer sheet side from the standpoint of effective utilization of heat energy. However, it is more preferable to apply heat energy from the heat transferable sheet side for better control of the heat energy applied, thereby expressing the gradation of the density of the image, or to promote diffusion of the colorant on the heat transferable sheet, thereby effecting expression of continuous gradation of the image more positively. Also the method of applying heat energy from both sides affords the advantages of the above two methods at the same time.

When a thermal head is used as the heat source for imparting heat energy, by modulating the voltage or the pulse width applied to the thermal head, the heat energy being applied can be varied continuously or in multiple steps.

When a laser beam is used as the heat source for applying heat energy, the heat energy can be varied by varying the dose of or irradiation area of the laser beam. By the use of a dot generator having acoustic optical elements built therein, heat energy can be also obtained depending on the size of dots. Also, when employing a laser beam, it is preferable that the heat transfer sheet adhere well to the heat transferable sheet, and the surface to be irradiated by the laser beam is preferably colored black for better absorption of the laser beam.

Alternatively, a substance which is nonsublimatable and can absorb the laser beam to convert it to heat may be added in the heat transfer layer 3, whereby heat can be transmitted to the dye more efficiently, and the dissolving ability can be enhanced.

When an IR-ray flash lamp is used as the heat source for imparting heat energy, it may be used similarly as in the case of using a laser beam, or by the use of a pattern expressing continuously the density of the image such as in black color or dot pattern, or the light may be projected through these patterns. Alternatively, the colored layer of one surface such as black color may be combined with a negative pattern corresponding to the negative of the above mentioned pattern.

By imparting heat energy to the interface between the heat transfer layer and the receiving layer as described above, the dye in the heat transfer layer is caused to thermally migrate to the receiving layer 13 in the amount corresponding to the heat energy received thereat.

Figure 4:
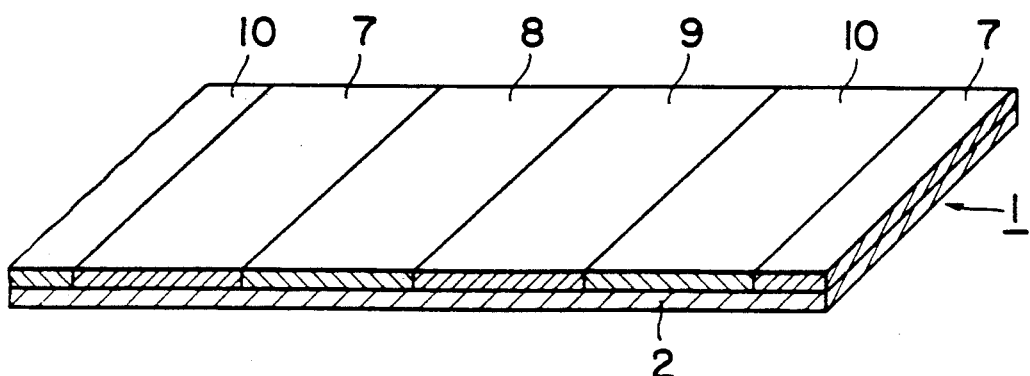
Figure 5:
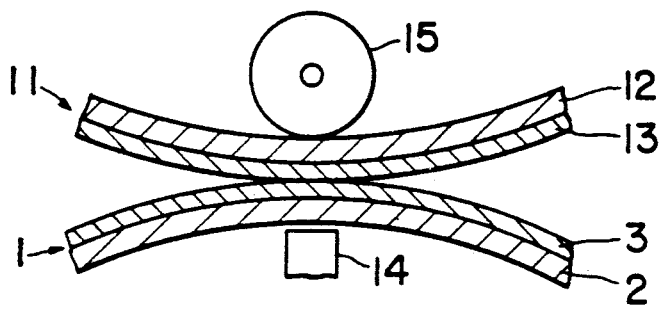
FIG. 5 is a schematic side view indicating an example of a method of carrying out transfer with a heat transfer sheet of the invention.

According to the heat transfer recording as described above, the dye corresponding to the heat energy can be heat transferred to the receiving layer to accomplish recording of one color. Furthermore, the above method can be practiced by exchanging the heat transfer sheet, for example, by exchanging successively with the heat transfer sheets of yellow color, red color, blue color and, if necessary, black color, and heat transfer corresponding to the respective colors can be carried out, whereby a color image of color photographic tone comprising hybridization of the respective colors can be also obtained. Instead of using the heat transfer sheets of the respective colors, by the use of the heat transfer sheets having areas formed previously by coating separately into the respective colors as shown in FIG. 4, first by use of the area of yellow color, yellow part image is heat transferred, then heat transfer is carried out by the use of the area of red color, followed successively by repetitions of the same procedure with other colors, whereby partial color images of yellow, red, blue and, if necessary, black colors can be heat transferred. By this method, there is afforded an advantage in that exchange of the heat transfer sheet is not required.

Also, by controlling the size of the heat source used for imparting the heat energy, the adhesiveness between the heat transfer sheet and the heat tansferable sheet, and the heat energy suitably, the image obtained can be improved in quality.

The heat transfer sheet according to the present invention can be utilized by combination with a heat transferable sheet for printing by use of various printers of thermal printing systems, facsimiles, print preparation of photographs according to the magnetic recording system, and print preparation from television screens.

For example, one television picture screen received can be memorized as the signals of the respective partial color image patterns, the signals of the respective partial color patterns outputted, the heat energies corresponding to the signals imparted by means of a heat source as described above such as a thermal head to the superposed heat transfer sheet and heat transferable sheet, and heat transfer effected successively for the respective colors, whereby the television picture can be reproduced as a print in the shape of a sheet. When a combination of a heat transferable sheet with the heat transfer sheet of the present invention is utilized for print-out of such a picture, it is generally convenient for obtaining a reflected image to use as the heat transferable sheet a white receiving layer alone, or a colorless transparent receiving layer backed with a substrate such as paper or a white receiving layer backed with a substrate such as paper.

The same operation as described above is also applicable when utilizing a combination of letters, figures, symbols and colors, etc., or graphic patterns formed on CRT picture surface by an operation of a computer as the original image, and also when the original image is a fixed image such as a picture, photograph, printed matter, or a practical matter such as a person, stationary matter, or landscape, the above operation can be carried out by the use of a suitable means such as a video camera. Further, in creating the signals of the respective colors from the original image, an electronic plate making machine (color scanner) used for photographic plate making for printing may also be used.

(II) Process for Producing Polyvinyl Acetacetal Resin

Next, the process for producing a polyvinyl acetacetal resin having particularly excellent characteristics as the heat-resistant resin which can be used as the binder component in the ink composition for heat transfer layer of the above heat transfer sheet of the present invention will be described in detail.

Generally speaking, polyvinyl acetal resin has been known as a resin of excellent heat resistance. This resin can be obtained by condensation reaction of a polyvinyl alcohol with an aldehyde (formaldehyde, acetaldehyde, butylaldehyde, etc.). Particularly, as the number of carbon atoms forming the acetal ring of the polyvinyl acetal becomes smaller, the glass transition temperature becomes higher, whereby the heat resistance is better as is known in the art ("Mechanical Properties of Polymers", p. 19, published by Kagaku Dohjin, 1965). However, polyvinyl formal with the smallest carbon number of the acetal ring is specific in solubility in solvents, and available solvents are limited. For example, polyvinyl formal with high formalization is soluble only in limited solvents such as methylene chloride, methylene chloride-chloroform, methanol, glycol, formalin, furfural, and benzene-alcohol. Therefore, the use of a polyvinyl acetacetal resin as a heat resistant resin has been desired.

In the condensation reaction in which a polyvinyl acetacetal resin is obtained by the condensation reaction of a polyvinyl alcohol with acetaldehyde, due to low reactivity of acetaldehyde, a highly acetalated product (acetalation degree of 60 mol % or higher) cannot be easily obtained. Polyvinyl acetacetal resins with low acetalation degree are water-soluble, and become water-insoluble with the progress of acetalation. For this reason, polyvinyl acetacetal resins are generally commercially available as water-soluble acetals (low acetalation products). Such water-soluble polyvinyl acetacetal resins cannot be used as the heat-resistant resin.

Even when the reactivity of acetaldehyde is enhanced by increasing the reaction temperature in order to obtain a polyvinyl acetacetal resin with high acetalation degree, the dissolution limiting point (limiting acetalation degree which makes the polymer insoluble in water) of the acetalated product is lowered by increase in the reaction temperature to cause precipitation of low acetalation products. The low acetalation products are in the form of huge particles which cannot be easily attacked by acetaldehyde, and therefore acetalation will not proceed further. Accordingly, no desired high acetalation product can be obtained. Besides, the huge particulate acetalation product also cannot be readily purified because acid catalyst may remain with the particles, etc. Also, deviation in acetalation degree within the particles becomes larger.

The process of the present invention solves the above problems of the prior art, and its object is to provide a process for producing a polyvinyl acetacetal resin with a high acetalation degree (60 mol % or higher, preferably 65 mol % or higher, more preferably 70 mol % or higher).

Another object of the present invention is to provide a process for producing a polyvinyl acetacetal resin with little deviation in particle size without huge particles. Still another object of the present invention is to provide a process for producing a polyvinyl acetacetal resin with little deviation in acetalation degree. Still another object of the present invention is to provide a process for producing a polyvinyl acetacetal resin with no coloration. Still another object of the present invention is to provide a process for producing a polyvinyl acetacetal resin with good solvent solubility.

The process of the present invention has been achieved on the basis of the discovery by the present inventors that, in a process for producing a polyvinyl acetacetal resin, by maintaining a high temperature after precipitation of a partially acetalated product by permitting acetalation to proceed gently at a low temperature in aqueous phase in the presence of an acid catalyst, a polyvinyl acetacetal resin with high acetalation can be obtained, and that, by controlling the amount of the acid catalyst and the reaction temperature, a polyvinyl acetacetal resin with little deviation in particle size, no coloration and also good solvent solubility can be obtained.

The process for producing a polyvinyl acetacetal resin of the present invention by the reaction of a polyvinyl alcohol and acetaldehyde in aqueous phase in the presence of 4 to 10% by weight of an acid catalyst comprises initiating precipitation of an acetalated product by maintaining the reaction system at 8° to 17° C. for 30 minutes or longer, and then maintaining said reaction system at a temperature of 25° to 40° C., whereby the above objects can be accomplished.

Polyvinyl acetacetal has greater solubility in water as compared with polyvinyl butyral. For example, while the dissolution limiting point (limiting acetalation degree which makes the polymer insoluble in water) is 20 to 25 mol %, the dissolution limiting point of polyvinyl acetacetal is 45 to 60 mol %. The dissolution limiting point is lowered with elevation in temperature. On the other hand, acetaldehyde has lower reactivity with polyvinyl alcohol as compared with butylaldehyde. Therefore, in the production of a polyvinyl acetacetal resin, for obtaining a high acetalation product, it is necessary to carry out high acetalation by permitting acetalation to proceed gently in a state wherein polyvinyl acetacetal is dissolved in water. For such reasons, in the production of polyvinyl acetacetal of the present invention, after addition of an acid catalyst and acetaldehyde to polyvinyl alcohol, the reaction system is maintained at a low temperature for a certain period of time to accomplish gradually high acetalation and to precipitate the acetalated product. When precipitation of the acetalated product is rapid, the dissolution limiting point is elevated by lowering the reaction temperature to ensure maintenance time of at least 30 minutes until precipitation initiation.

In the present invention, the method for adding acetaldehyde to polyvinyl alcohol is not limited to the specific one. The method for the adding step includes (a) one step addition, (b) divisional addition, and (c) continuous addition. In the case where said adding step (b) or (c) is used, it is necessary to maintain the reaction system, at least, at 8° to 17° C. for 30 minutes or longer as mentioned above.

The amount of the acid catalyst is preferably in the range of 4 to 10% by weight. If it is lower than 4% by weight, ample acetalation reaction cannot proceed to produce polyvinyl acetacetal resin of a desired acetalation degree. On account of a lower acetalation degree, the particles will block each other to form huge particles. If it is over 10% by weight, acetaldehyde undergoes aldol condensation due to excessive acid, whereby there is the possibility of the polyvinyl acetacetal resin becoming colored. As the acid catalyst, for example, hydrochloric acid, sulfuric acid, or nitric acid can be employed.

The amount of acetaldehyde is 0.7 to 2.2 mols, preferably 1.0 to 2.2 mols, based on 2 mols (mols of hydroxyl groups) of polyvinyl alcohol. If it is lower than 0.7 mols, ample acetalation reaction cannot proceed to produce polyvinyl acetacetal resin of a desired acetalation degree. If it is over 2.2 mols, the amount of acetaldehyde in the reaction system becomes excessive, whereby the dissolution limiting point of the acetalated product will be increased. Accordingly, it takes a long time for precipitation of the acetalated product, and besides irregularities in particle size occurs in the polyvinyl acetacetal resin obtained.

The reason is carried out in aqueous phase. In an alcohol such as methanol, acetalation equilibrium will be established, whereby polyvinyl acetacetal resin of high acetalation degree cannot be obtained.

The reaction system of polyvinyl alcohol and acetaldehyde in which an acid catalyst is added in aqueous phase is maintained at 8° to 17° C. for 30 minutes or longer, preferably 1 to 6 hours. By this procedure, acetalation proceeds gently to effect precipitation of the acetalated product. If the temperature is lower than 8° C., precipitation of the acetalated product takes a long time, and besides irregularities in particle size occur in the resultant polyvinyl acetacetal resin. If it is higher than 17° C., because the dissolution limiting point is lowered, precipitation of a low acetalation product results. The precipitated low acetalation product is in the form of huge particles, which cannot be readily attacked by aldehyde, and therefore further acetalation will not proceed. For this reason, a polyvinyl acetacetal resin of high acetalation degree cannot be obtained.

The precipitated acetalated product has an average particle size generally of 25 to 75 $\mu$m. If it is lower than 25 $\mu$m, scattering may occur during use of the resin, whereby workability will be lowered. If it is higher than 75 $\mu$m, in the subsequent maintenance at constant temperature, further acetalation will not proceed to produce a desired high acetalation product. Also, the acid catalyst may remain within the particles to make purification difficult.

The reaction in which the acetalation product has been precipitated is subsequently maintained constantly at a temperature of 25° to 40° C. generally for 2 to 8 hours. If it is lower than 25° C., a high acetalation product may be obtained, but much low acetalation products are contained, to make the distribution of the acetalation degree of the polyvinyl acetacetal resin broader. If it is higher than 40° C., acetaldehyde is volatilized into the gas phase portion of the reaction system, whereby acetalation, on the contrary, will be lowered. By volatilization of acetaldehyde, the environment around the reaction system will be contaminated. As caused by deacetalation or acetal formation between molecules, the solvent solubility of the polyvinyl acetacetal resin obtained will be also lowered. Particularly, insolubilization in a nonalcoholic solvent (methyl ethyl ketone, etc.) will proceed.

The polyvinyl alcohol preferably has a polymerization degree of 500 to 3500. If the polymerization degree of polyvinyl alcohol is lower, the reaction rate of acetalation becomes rapid. Therefore, even when precipitation of the acetalated product is accelerated by increasing the reaction temperature to lower the dissolution limiting point, a high acetalation product can be obtained. The residual acetyl groups in the polyvinyl alcohol are suitably 0.5 to 12 mol %. The polyvinyl alcohol concentration in the reaction system is not particularly limited, but it is generally made 4 to 10% by weight.

The present invention will now be described more fully with respect to Examples, which are presented as illustrative only and are not intended to limit the scope of the present invention.

EXAMPLE A-1

A polyvinyl acetacetal resin to serve as the binder component was produced according to the following method.

First, a 5-liter separable flask was charged with 2,790 g of pure water, and 220 g of a polyvinyl alcohol (polymerization degree: 2,400, number average molecular weight: about 135,000, saponification degree: 98.2%) was added thereto to be completely dissolved therein. Next, while the aqueous solution was maintained at a liquid temperature of 20° C., 650 g of 35% hydrochloric acid was added, and then the liquid temperature was lowered to 10° C., whereupon 137 g of acetaldehyde was added suitably to precipitate colorless powder. Subsequently, the temperature of the reaction system was elevated to 30° C., maintained constantly thereat for 3 hours, after which washing with water and neutralization were carried out to remove the catalyst and unreacted aldehyde, thus obtaining a polyvinyl acetacetal resin. The polyvinyl acetacetal resin was found to have an acetalation degree of 74.1 mol % (wt. %), 19.5% by weight of the vinyl alcohol moiety and a glass transition temperature (Tg) of 113° C.

EXAMPLE A-2

Example A-1 was repeated except for the use of a polyvinyl alcohol having a polymerization degree of 500, a number average molecular weight of about 30,000, a saponification degree of 98.2 mol %, to obtain a resin. The resin had the characteristics shown in Table 1.

EXAMPLE A-3

Example A-1 was repeated except for the use of a polyvinyl alcohol having a polymerization degree of 3,500, a number average molecular weight of about 200,000, a saponification degree of 98.2 mol %, to obtain a resin. The resin had the characteristics shown in Table 1.

EXAMPLE A-4

A resin was obtained in the same manner as in Example A-1 except for the changing of the amount of aldehyde used to 80 g.

EXAMPLE A-5

Example A-1 was repeated except for the changing of the amount of acetaldehyde used to 179 g, and, after precipitation of colorless powder, the elevating of the temperature of the reaction system to 35° C. and maintaining the system constantly at said temperature for 6 hours.

EXAMPLE A-6

Example A-1 was repeated except for the use of a polyvinyl alcohol having a polymerization degree of 1,700, a number average molecular weight of about 100,000, a saponification degree of 99.6 mol %, to obtain a resin.

EXAMPLE A-7

Example A-1 was repeated except for the use of a polyvinyl alcohol having a polymerization degree of 1,700, a number average molecular weight of about 100,000, a saponification degree of 88.0 mol % and the changing of the amount of acetaldehyde used to 111 g, to obtain a resin.

EXAMPLE A-8

A resin was obtained according to the procedure in Example A-1 except that the reaction was carried out by adding suitably 10 g of butylaldehyde and 94 g of acetaldehyde as the aldehyde used.

EXAMPLE A-9

A resin was obtained according to the procedure in Example A-1 except that the reaction was carried out by adding suitably 25 g of octylaldehyde and 80 g of acetaldehyde as the aldehyde used.

EXAMPLE A-10

A resin was obtained according to the procedure in Example A-1 except that the reaction was carried out by adding suitably 20 g of butylaldehyde and 111 g of acetaldehyde as the aldehyde used.

EXAMPLE A-11

A resin was obtained according to the procedure in Example A-1 except for the changing of the amount of aldehyde used to 63 g.

EXAMPLE A-12

Example A-1 was repeated except for the use of a polyvinyl alcohol having a polymerization degree of 2,400, a number average molecular weight of about 135,000 and a saponification degree of 88.0 mol %, the changing of the amount of acetaldehyde used to 63 g, and, after precipitation of colorless powder, the elevating of the temperature of the reaction system to 35° C. and maintaining the system constantly at said temperature for 6 hours.

EXAMPLE A-13

Example A-1 was repeated except for the use of a aldehyde which was obtained by adding 61 g of formaldehyde (35 wt. % solution of formalin) and 116 g of acetaldehyde. After colorless powder was precipitated, the temperature of the reaction system was elevated to 40° C., and was maintained constantly at said temperature for 6 hours.

EXAMPLE A-14

Example A-1 was repeated except for the use of a polyvinyl alcohol having a polymerization degree of 1,000, a number average molecular weight of about 60,000, a saponification degree of 98.2 mol %, to obtain a resin. The resin had the characteristics shown in Table 1.

EXAMPLE A-15

Example A-1 was repeated except for the use of 24 g of a polyvinyl alcohol (a polymerization degree of 500, a number average molecular weight of about 30,000, a saponification degree of 98.2 mol %) and 212 g of a polyvinyl alcohol (a polymerization degree of 2,400, a number average molecular weight of about 135,000, a saponification degree of 98.2 mol %), to obtain a resin. The resin had the characteristics shown in Table 1.

The characteristics of the resins obtained in the above Examples A-1 to A-15 are shown below in Table 1.

TABLE 1

| Example | Polymerization degree | Number average molecular weight | Vinyl alcohol moiety mol % (wt %) | Residual acetyl moiety mol (wt %) | Acetalated moiety mol % (wt %) | | | Acetacetal relative to acetalated moiety wt % | Tg (°C.) |
|---|---|---|---|---|---|---|---|---|---|
| | | | | | Acet | Butyl | Octyl | | |
| A-1 | 2400 | ca. 135,000 | 24.1(19.5) | 1.8(2.8) | 74.1(77.7) | — | — | 100.0 | 113 |
| A-2 | 500 | ca. 30,000 | 22.4(18.0) | 1.8(2.8) | 75.8(79.2) | — | — | 100.0 | 111 |
| A-3 | 3500 | ca. 200,000 | 23.2(18.7) | 1.8(2.8) | 75.0(78.5) | — | — | 100.0 | 112 |
| A-4 | 2400 | ca. 135,000 | 33.2(27.5) | 1.8(2.9) | 65.0(69.6) | — | — | 100.0 | 106 |
| A-5 | 2400 | ca. 135,000 | 18.4(14.7) | 1.8(2.8) | 79.8(82.5) | — | — | 100.0 | 122 |
| A-6 | 1700 | ca. 100,000 | 26.6(21.8) | 0.4(0.6) | 73.0(77.6) | — | — | 100.0 | 110 |
| A-7 | 1700 | ca. 100,000 | 24.9(19.1) | 12.0(18.0) | 63.1(62.9) | — | — | 100.0 | 103 |
| A-8 | 2400 | ca. 135,000 | 24.2(19.4) | 1.8(2.8) | 69.0(71.4) | 5.0(6.4) | — | 91.8 | 104 |
| A-9 | 2400 | ca. 135,000 | 29.2(23.2) | 1.8(2.8) | 65.0(66.9) | — | 4.0(7.1) | 90.4 | 100 |
| A-10 | 2400 | ca. 135,000 | 24.2(19.1) | 1.8(2.8) | 64.0(65.4) | 10.0(12.7) | — | 83.8 | 100 |
| A-11 | 2400 | ca. 135,000 | 48.2(41.4) | 1.8(3.0) | 50.0(55.6) | — | — | 100.0 | 95 |
| A-12 | 2400 | ca. 135,000 | 37.0(29.3) | 12.0(18.5) | 51.0(52.2) | — | — | 100.0 | 92 |
| A-13 | 2400 | ca. 135,000 | 26.9(22.3) | 1.8(2.9) | 56.3(14.2) | 15.0(60.6) | — | 81.1 | 116 |
| A-14 | 1000 | ca. 60,000 | 24.3(19.7) | 1.8(2.8) | 73.9(77.5) | — | — | 100.0 | 110 |
| A-15 | 500-1 2400-9 | ca. 127,000 | 23.9(19.4) | 1.8(2.8) | 74.3(77.8) | — | — | 100.0 | 112 |

COMPARATIVE EXAMPLE A-1

Example A-1 was repeated except for changing the amount of acetaldehyde used to 53 g.

COMPARATIVE EXAMPLE A-2

As the resin for binder, Denkabutyral "6000C" produced by Denki Kagaku K.K. was used.

COMPARATIVE EXAMPLE A-3

A resin was obtained as in Example A-1 except that the reaction was carried out by adding suitably 30 g of butylaldehyde and 111 g of acetaldehyde as the aldehyde used.

The characteristics in the above Comparative Examples are shown in the following Table.

TABLE 2

| Comparative Example | Polymerization degree | Number average molecular weight | Vinyl alcohol moiety mol (wt %) | Residual acetyl moiety mol (wt %) | Acetalated moiety mol % (wt %) | | | Acetacetal relative to acetalated moiety wt % | Tg (°C.) |
|---|---|---|---|---|---|---|---|---|---|
| | | | | | Acet | Butyl | Octyl | | |
| A-1 | 2400 | ca. 135,000 | 54.2(47.2) | 1.8(3.1) | 44.0(49.7) | — | — | 100.0 | 90 |
| A-2 | — | ca. 155,000 | (16.0) | — | — | — | — | — | 90 |
| A-3 | 2400 | ca. 135,000 | 22.6(17.6) | 1.8(2.7) | 61.2(61.6) | 14.4(18.1) | — | 76.8 | 87 |

EXAMPLE B-1

A 5-liter separable flask was charged with 2,790 g of pure water, and 220 g of a polyvinyl alcohol (polymerization degree: 2,400, saponification degree: 98.8%) was added thereto to be completely dissolved therein. Next, while the aqueous solution was maintained at a liquid temperature of 20° C., 650 g of 35 wt. % conc. hydrochloric acid was added. The amount of hydrochloric acid was 6% by weight. The liquid temperature was lowered to 11° C., whereupon 143 g of acetaldehyde was added suitably to precipitate a colorless powder. The amount of acetaldehyde was 1.3 mols per 2 mols of polyvinyl alcohol. The time from addition of acetaldehyde up to precipitation was 2 hours. The reaction system was elevated in temperature to 30° C. and maintained constantly thereat for 5 hours, after which washing with water and neutralization were carried out to remove the catalyst and unreacted aldehyde, thus obtaining a polyvinyl acetacetal resin. The polyvinyl acetacetal resin was found to have an acetalation degree of 75.0 mol % (wt. %). Also, the resin had an average particle size of about 40 μm. These results are shown below in Table 3.

EXAMPLE B-2

A polyacetal resin was prepared as in Example B-1 except for changing acetaldehyde to 88 g (0.8 mol per 2 mols of polyvinyl alcohol). The time from addition of acetaldehyde up to precipitation was 2 hours. The polyvinyl acetacetal resin obtained was found to have an acetalation degree of 69.3 mol % and an average particle size of about 40 μm. These results are shown below in Table 3.

EXAMPLE B-3

A polyvinyl acetacetal resin was prepared as in Example B-1 except for using 220 g of acetaldehyde (2.0 mols per 2 mols of polyvinyl alcohol), changing the reaction temperature to 10° C. and maintaining the temperature after resin precipitation constantly at 35° C. for 5 hours. The time from addition of acetaldehyde up to precipitation was 3 hours. The polyvinyl acetacetal resin obtained was found to have an acetalation degree of 77.1 mol % and an average particle size of about 40 μm. These results are shown below in Table 3.

EXAMPLE B-4

A polyvinyl acetacetal resin was prepared as in Example B-1 except for changing the reaction temperature to 9° C. and maintaining the temperature after resin precipitation constantly at 35° C. for 5 hours. The time from addition of acetaldehyde up to precipitation was 6 hours. The polyvinyl acetacetal resin obtained was found to have an acetalation degree of 75.0 mol % and an average particle size of about 25 μm. These results are shown below in Table 3.

EXAMPLE B-5

A polyvinyl acetacetal resin was prepared as in Example B-1 except for changing the reaction temperature to 16° C. and maintaining the temperature after resin precipitation constantly at 35° C. for 2 hours. The time from addition of acetaldehyde up to precipitation was 30 minutes. The polyvinyl acetacetal resin obtained was found to have an acetalation degree of 74.6 mol % and an average particle size of about 75 μm. These results are shown below in Table 3.

EXAMPLE B-6

A polyvinyl acetacetal resin was prepared as in Example B-1 except for changing the amount of hydrochloric acid to 420 g (4% by weight), the reaction temperature to 12° C. and maintaining the temperature after resin precipitation constantly at 25° C. for 5 hours. The time from addition of acetaldehyde up to precipitation was 4.5 hours. The polyvinyl acetacetal resin obtained was found to have an acetalation degree of 66.1 mol % and an average particle size of about 40 μm. These results are shown below in Table 3.

EXAMPLE B-7

A polyvinyl acetacetal resin was prepared as in Example B-1 except for changing the amount of pure water to 2,400 g, the amount of hydrochloric acid to 1,200 g (10% by weight), the amount of acetaldehyde to 220 g (2.0 mols per 2 mols of polyvinyl alcohol), the reaction temperature to 9° C. and maintaining the temperature after resin precipitation constantly at 40° C. for 8 hours. The time from addition of acetaldehyde up to precipitation was 1 hour. The polyvinyl acetacetal resin obtained was found to have an acetalation degree of 79.4 mol % and an average particle size of about 40 μm. These results are shown below in Table 3.

EXAMPLE B-8

A polyvinyl acetacetal resin was prepared as in Example B-1 except for using a polyvinyl alcohol having a polymerization degree of 500, a saponification degree of 98.8 mol % and changing the amount of hydrochloric acid to 420 g (4% by weight). The time from addition of acetaldehyde up to precipitation was 1 hour. The polyvinyl acetacetal resin obtained was found to have an acetalation degree of 70.8 mol % and an average particle size of about 40 μm. These results are shown below in Table 3.

EXAMPLE B-9

A polyvinyl acetacetal resin was prepared as in Example B-1 except for using a polyvinyl alcohol having a polymerization degree of 3,500, a saponification degree of 98.8 mol %. The time from addition of acetaldehyde up to precipitation was 5 hours. The polyvinyl acetacetal resin obtained was found to have an acetalation degree of 75.3 mol % and an average particle size of about 45 μm. These results are shown below in Table 3.

EXAMPLE B-10

A polyvinyl acetacetal resin was prepared as in Example B-1 except for using a polyvinyl alcohol having a polymerization degree of 2,400, a saponification degree of 88.0 mol %. The time from addition of acetaldehyde up to precipitation was 2 hours. The polyvinyl acetacetal resin obtained was found to have an acetalation degree of 66.9 mol % and an average particle size of about 40 μm. These results are shown below in Table 3.

EXAMPLE B-11

A polyvinyl acetacetal resin was prepared as in Example B-1 except for using a polyvinyl alcohol having a polymerization degree of 1,700, a saponification degree of 99.2 mol % and changing the reaction temperature to 10° C. The time from addition of acetaldehyde up to precipitation was 3 hours. The polyvinyl acetacetal resin obtained was found to have an acetalation degree of 74.8% mol % and an average particle size of about 30 μm. These results are shown below in Table 3.

EXAMPLE B-12

A polyvinyl acetacetal resin was prepared as in Example B-1 except for using 71.5 parts of aldehyde (0.65 mols per 2 mols of polyvinyl alcohol) and changing the reaction temperature to 16° C. The time from addition of acetaldehyde up to precipitation was 6 hours. The polyvinyl acetacetal resin obtained was found to have an acetalation degree of 62.5 mol % and an average particle size of about 195 μm. These results are shown below in Table 3.

EXAMPLE B-13

A polyvinyl acetacetal resin was prepared as in Example B-1 except for using 264 parts of aldehyde (2.4 mols per 2 mols of polyvinyl alcohol) and changing the reaction temperature to 10° C. The time from addition of acetaldehyde up to precipitation was 9 hours. The polyvinyl acetacetal resin obtained was found to have an acetalation degree of 78.4 mol % and an average particle size of about 70 μm. These results are shown below in Table 3.

EXAMPLE B-14

A polyvinyl acetacetal resin was prepared as in Example B-1 except for using a polyvinyl alcohol having a polymerization degree of 1,000, a saponification degree of 98.8 mol % and changing the amount of hydrochloric acid to 420 g (4% by weight) and changing the reaction temperature to 15° C. The time from addition of acetaldehyde up to precipitation was 1.5 hours. The polyvinyl acetacetal resin obtained was found to have an acetalation degree of 70.6 mol % and an average particle size of about 40 μm. These results are shown below in Table 3.

EXAMPLE B-15

A polyvinyl acetacetal resin was prepared as in Example B-1 except for using 24 g of a polyvinyl alcohol (a polymerization degree of 500, a saponification degree of 98.8 mol %) and 212 g of a polyvinyl alcohol (a polymerization degree of 2,400, a saponification degree of 98.8 mol %), and changing the reaction temperature to 12° C. The time from addition of acetaldehyde up to precipitation was 2 hours. The polyvinyl acetacetal resin obtained was found to have an acetalation degree of 74.6 mol % and an average particle size of about 40 μm. These results are shown below in Table 3.

COMPARATIVE EXAMPLE B-1

A polyvinyl acetacetal resin was prepared as in Example B-1 except for changing the amount of hydrochloric acid to 200 g (2% by weight). The time from addition of acetaldehyde up to precipitation was 20 hours. The polyvinyl acetacetal resin obtained was found to have an acetalation degree of 60.3 mol % and an average particle size of several mm. This resin was blocked. These results are shown below in Table 3.

COMPARATIVE EXAMPLE B-2

A polyvinyl acetacetal resin was prepared in the same manner as in Example B-1 except for changing the amount of pure water to 2,250 g, the amount of hydrochloric acid to 1,400 g (12% by weight) and changing the reaction temperature to 10° C. The time from addition of acetaldehyde up to precipitation was 30 minutes. The polyvinyl acetacetal resin obtained was found to have an acetalation degree of 77.2 mol % and an average particle size of about 40 μm. This resin was colored in pale yellow as a whole. These results are shown below in Table 3.

COMPARATIVE EXAMPLE B-3

Preparation of a polyvinyl acetacetal resin was attempted similarly as in Example B-1 except for changing the reaction temperature to 6° C., but even after the elapse of 24 hours, no precipitation of the resin was observed. This may be considered to be due to the low reaction temperature, whereby the dissolution limiting concentration of the acetalated product was too high.

COMPARATIVE EXAMPLE B-4

A polyvinyl acetacetal resin was prepared as in Example B-1 except for changing the reaction temperature to 19° C. The time from addition of acetaldehyde to precipitation was 6 minutes. The polyvinyl acetacetal resin obtained was found to have an acetalation degree of 70.0 mol % and an average particle size of about 400 μm. This resin was found to be greatly varied in particle size from 200 to 500 μm. These results are shown below in Table 3.

COMPARATIVE EXAMPLE B-5

A polyvinyl acetacetal resin was prepared as in Example B-1 except for maintaining the temperature after resin precipitation constantly at 50° C. for 3 hours. The time from addition of acetaldehyde up to precipitation was 2 hours. The polyvinyl acetacetal resin obtained was found to have an acetalation degree of 71.5 mol % and an average particle size of about 60 μm.

The acetalation degree was lower than that of the resin obtained in Example B1. This may be considered to be due to volatilization of acetaldehyde into the gas phase portion of the reaction system, whereby deacetalation occurred. The polyvinyl acetacetal resin was insoluble in non-alcoholic solvent (e.g. methyl ethyl ketone, etc.). This may be estimated to be to insolubilization between molecules accompanied with deacetalation. These results are shown below in Table 3.

COMPARATIVE EXAMPLE B-6

A polyvinyl acetacetal resin was prepared as in Example B-1 except for changing the amount of hydrochloric acid to 1,408 g (13% by weight) and the reaction temperature to 10° C. and maintaining the temperature after resin precipitation constantly at 60° C. for 3 hours. The time from addition of acetaldehyde up to precipitation was 30 minutes. The polyvinyl acetacetal resin obtained was found to have an acetalation degree of 68.4 mol % and an average particle size of about 70 μm. However, this resin was found to be colored pale yellow as a whole.

The acetalation degree was lower than that of the resin obtained in Example B1. This may be considered to be due to volatilization of acetaldehyde into the gas phase portion of the reaction system, whereby deacetalation occurred. The polyvinyl acetacetal resin was insoluble in non-alcoholic solvent (e.g. methyl ethyl ketone, etc.). This may be ascribed to insolubilization between molecules accompanying deacetalation. These results are shown below in Table 3.

As is apparent from the above Examples and Comparative Examples, according to the process for producing polyvinyl acetacetal resin of the present invention, a polyvinyl acetacetal resin of high acetalation degree can be obtained. This resin is little irregularity of particle size and is also free from coloration. Furthermore, solvent solubility is good. If the amount of hydrochloric acid is made 2% by weight, a polyvinyl acetacetal resin of high acetalation degree cannot be obtained. Due to low acetalation degree, the particles are susceptible to blocking of each other to become huge particles. With an amount of hydrochloric acid of 12% by weight, the resultant polyvinyl acetacetal resin will be colored pale yellow as a whole. If the reaction temperature is 6° C., because the dissolution limiting concentration is too high, no precipitation of resin can be observed even after the elapse of 24 hours. If the reaction temperature is made 19° C., the average particle size will become greater, and also the particle sizes will vary widely. If the temperature constantly maintained during resin precipitation is 50° C. or 60° C., the acetalation degree will be lowered due to deacetalation. Moreover, the resin obtained becomes insoluble in non-alcoholic solvent (e.g., methyl ethyl ketone).

TABLE 3

| | Polyvinyl alcohol polymerization degree | Acetaldehyde charged amount (mol) | HCl charged amount (wt %) | Reaction temperature (°C.) | Precipitation time (Hr) | Constant temperature (°C.) | Constant temp. time (Hr) | Residual acetyl group (mol %) | Acetalation degree (mol %) | Average particle size (μm) | Other quality |
|---|---|---|---|---|---|---|---|---|---|---|---|
| Exam. B-1 | 2400 | 1.3 | 6 | 11 | 2.0 | 30 | 5 | 1.2 | 75.0 | 40 | Excellent |
| Exam. B-2 | 2400 | 0.8 | 6 | 11 | 2.0 | 30 | 5 | 1.2 | 69.3 | 40 | " |
| Exam. B-3 | 2400 | 2.0 | 6 | 10 | 3.0 | 35 | 5 | 1.2 | 77.1 | 40 | " |
| Exam. B-4 | 2400 | 1.3 | 6 | 9 | 6.0 | 35 | 5 | 1.2 | 75.0 | 25 | " |
| Exam. B-5 | 2400 | 1.3 | 6 | 16 | 0.5 | 35 | 2 | 1.2 | 74.6 | 75 | " |
| Exam. B-6 | 2400 | 1.3 | 4 | 12 | 4.5 | 25 | 5 | 1/2 | 66.1 | 40 | " |
| Exam. B-7 | 2400 | 2.0 | 10 | 9 | 1.0 | 40 | 8 | 1.2 | 79.4 | 40 | " |
| Exam. B-8 | 500 | 1.3 | 4 | 16 | 1.0 | 30 | 5 | 1.2 | 70.8 | 40 | " |
| Exam. B-9 | 3500 | 1.3 | 6 | 11 | 5.0 | 30 | 5 | 1.2 | 75.3 | 45 | " |
| Exam. B-10 | 2400 | 1.3 | 6 | 11 | 2.0 | 30 | 5 | 12.0 | 66.9 | 40 | " |
| Exam. B-11 | 1700 | 1.3 | 6 | 10 | 3.0 | 30 | 5 | 0.8 | 74.8 | 30 | " |
| Exam. B-12 | 2400 | 0.65 | 6 | 16 | 6.0 | 30 | 5 | 1.2 | 62.5 | 195 | " |
| Exam. B-13 | 2400 | 2.4 | 4 | 10 | 9.0 | 30 | 5 | 1.2 | 78.4 | 70 | " |
| Exam. B-14 | 1000 | 1.3 | 4 | 15 | 1.5 | 30 | 5 | 1.2 | 70.4 | 40 | — |

TABLE 3-continued

| | Polyvinyl alcohol polymerization degree | Acetaldehyde charged amount (mol) | HCl charged amount (wt %) | Reaction temperature (°C.) | Precipitation time (Hr) | Constant temperature (°C.) | Constant temp. time (Hr) | Residual acetyl group (mol %) | Acetalation degree (mol %) | Average particle size (μm) | Other quality |
|---|---|---|---|---|---|---|---|---|---|---|---|
| Exam. B-15 | 500-1 2400-9 | 1.3 | 6 | 12 | 2 | 30 | 5 | 1.2 | 74.6 | 40 | — |

TABLE 3 (bis)

| | Polyvinyl alcohol polymerization degree | Acetaldehyde charged amount (mol) | HCl charged amount (wt %) | Reaction temperature (°C.) | Precipitation time (Hr) | Constant temperature (°C.) | Constant temp. time (Hr) | Residual acetyl group (mol %) | Acetalation degree (mol %) | Average particle size (μm) | Other quality |
|---|---|---|---|---|---|---|---|---|---|---|---|
| Comparative Exam. B-1 | 2400 | 1.3 | 2 | 11 | 20.0 | 30 | 5 | 1.2 | 60.3 | several mm | Blocked |
| Comparative Exam. B-2 | 2400 | 1.3 | 12 | 10 | 0.5 | 30 | 5 | 1.2 | 77.2 | 40 | Colored |
| Comparative Exam. B-3 | 2400 | 1.3 | 6 | 6 | — | — | — | — | — | — | — |
| Comparative Exam. B-4 | 2400 | 1.3 | 6 | 19 | 0.1 | 30 | 5 | 1.2 | 70.0 | 400 | Blocked |
| Comparative Exam. B-5 | 2400 | 1.3 | 6 | 11 | 2.0 | 50 | 3 | 1.2 | 71.5 | 60 | Poor solubility |
| Comparative Exam. B-6 | 2400 | 1.3 | 13 | 10 | 0.5 | 60 | 3 | 1.2 | 68.4 | 70 | Poor coloration & solubility |

EXAMPLE C-1

On a polyethylene terephthalate film with a thickness of 6 μm (film for heat transfer, produced by Toray K.K.) applied on one surface with corona treatment as the support, an ink composition for heat transfer having the following composition was applied by wire bar coating to a coating amount of 1.3 g/m² on drying, which step was followed by drying, while the back surface was treated by applying one drop of a silicone oil (X-41.4003A, produced by Shinetsu Silicone K.K.) and spreading it over the whole surface to provide a heat transfer sheet. As the binder, the resin obtained in Example A-1 was used.

| Ink composition for heat transfer layer | |
|---|---|
| Dye (C.I. Solvent Blue 63) | 4.5 wt. parts |
| Binder | 4.3 wt. parts |
| Toluene | 45 wt. parts |
| Methyl ethyl ketone | 40 wt. parts |
| Isobutanol | 5 wt. parts |

The heat transfer layer of the heat transfer sheet thus obtained was transparent, and no particles were visible when observed by a microscope (magnification ×400).

Separately, by the use of a synthetic paper (Yupo FPG 150, produced by Oji Yuka Goseishi K.K.), an ink composition for formation of a receiving layer (image receiving layer) having the following composition was applied by wire bar coating to a thickness of 7 g/m² on drying and, after tentative drying by a hand dryer, dried in an oven at 100° C. for one hour to amply volatilize the solvent, thus providing a heat tranferable sheet. By this drying, the amino-modified silicone oil and the epoxy-modified silicone oil were bled partially to the surface to effect crosslinking reaction, thereby forming a mold release layer.

| Ink composition for forming receiving layer | |
|---|---|
| Polyester resin (1:1 mixture of Vyron 200 and Vyron 290 by Toyobo K.K.) | 10 wt. parts |
| Amino-modified silicone oil (KF-393, produced by Shinetsu Silicone K.K.) | 0.125 wt. parts |
| Epoxy-modified silicone oil (X-22-343, produced by Shinetsu Silicone K.K.) | 0.125 wt. parts |
| Toluene | 70 wt. parts |
| Methyl ethyl ketone | 10 wt. parts |
| Cyclohexanone | 20 wt. parts |

The heat transfer sheet and the heat transferable sheet obtained as described above were superposed so that the heat transfer layer contacted the receiving layer, and heat transfer was carried out by use of a heat transfer printer provided with a thermal head (partially glazed thin film type head, KMT-85-6MPD2, produced by Kyocera K.K.) under the following conditions.

Heat transfer conditions
Head application voltage: 11.25 V
Pulse width: 1.0–16.0 msec
printing speed: 33.3 msec/line
Density: 6 lines/mm
Platen hardness: 70°
Platen diameter: 25 mm
Line pressure: 4 kg/10 cm
Delivery speed: 5.0 mm/sec After heat transfer, during peel-off of the heat transfer sheet from the heat transferable sheet, there was no transfer of the heat transfer layer, and there was no ground staining of the non-printed portion whatsoever.

After heat transfer, the density at the site corresponding to the current pulse width of 14 msec of the image formed on the heat transferable sheet was measured by a reflective densitometer (Macbeth densitometer RD-918).

Storability Test

A heat transfer sheet prepared in the manner described above except that silicone oil was not applied, and the same synthetic paper as the above heat transferable sheet were both cut into the same size, superposed so that the heat transfer layer side of the heat transfer sheet contacted the synthetic paper and then placed in superposed state in a humidity-resistant packaging bag with a constitution of PET/PE/aluminum/PE, sealed by heat sealing and thereafter placed stationarily in an oven at 60° C. under a pressure of 17 g/m² from outside of the packaging bag, to carry out a storability test.

Thereafter, the package was taken out from the oven, left to cool to room temperature, and then the packaging bag was opened to take out the heat transfer sheet and the heat transferable sheet, and the state of the heat transfer layer of the heat transfer sheet was observed. As a result, no change in appearance was detected.

After the storability test, the density of the dye transferred onto the synthetic paper was measured by the reflective densitometer in the same manner as described above.

Further, after the back treatment was applied on the back surface of the heat transfer sheet after the storability test according to the same method as described above, printing was carried out under the same conditions as described above and the density of the image formed was measured. As a result, similar printing densities as in the case of using the heat transfer sheet before the storability test could be obtained.

The above evaluations were also conducted by the use of heat transfer sheets in which the dyes were changed to the following ones, and also similar results could be obtained.

(1) Disperse Red 60
(2) Solvent Blue 36
(3) Solvent Blue 35
(4) Disperse Blue 14
(5) Disperse Blue 24
(6) Disperse Red 4
(7) Solvent Yellow 14

EXAMPLES C-12 TO C-12

Heat transfer sheets were prepared as in Example C-1 except for the use of the resins obtained in the above Examples A-2 to A-12 as the binder, and printing characteristics and storabilities were examined. The results are shown in Table 4.

EXAMPLES D-1 TO D-5

Heat transfer sheets were prepared as in Example C-1 except for the use of the following composition for the heat transfer layer.

| D-1: | |
|---|---|
| Dye (C.I. Solvent Blue 63) | 4.5 wt. parts |
| Binder (A-1) | 3.2 wt. parts |
| Binder (A-2) | 0.3 wt. parts |
| Toluene | 46.0 wt. parts |
| Methyl ethyl ketone | 46.0 wt. parts |
| D-2: | |
| Dye (C.I. Solvent Blue 63) | 4.5 wt. parts |
| Binder (A-1) | 2.85 wt. parts |
| Binder (A-2) | 0.95 wt. parts |
| Toluene | 45.85 wt. parts |
| Methyl ethyl ketone | 45.85 wt. parts |
| D-3: | |
| Dye (C.I. Solvent Blue 63) | 4.5 wt. parts |
| Binder (A-1) | 3.2 wt. parts |
| Binder (A-14) | 0.3 wt. parts |
| Toluene | 46.0 wt. parts |
| Methyl ethyl ketone | 46.0 wt. parts |
| D-4: | |
| Dye (No. 75199-13-2) | 4.5 wt. parts |
| Binder (A-1) | 3.0 wt. parts |
| Binder (BL-3, produced Sekisui Kagaku-Kogyo, Japan) | 2.5 wt. parts |
| Toluene | 45.75 wt. parts |
| Methyl ethyl ketone | 45.75 wt. parts |
| D-5: | |
| Dye (C.I. Solvent Blue 63) | 4.5 wt. parts |
| Binder (A-15) | 3.5 wt. parts |
| Toluene | 46.0 wt. parts |
| Methyl ethyl ketone | 46.0 wt. parts |

In the following Tables (similarly in Table 5), "excellent" means the case when the surface of the transfer layer became a glossy surface, while "good" means the case when no precipitation of dye occurred but the surface became slightly matte.

TABLE 4

| Example | Printing density Before storage | Printing density After storage | Staining degree (Gray scale for JIS staining fastness test) | Appearance Before storage | Appearance After storage |
|---|---|---|---|---|---|
| C-1 | 2.22 | 2.20 | 4-5 | Excellent | Excellent |
| C-2 | 2.13 | 2.05 | 4-5 | " | " |
| C-3 | 2.24 | 2.19 | 4-5 | " | " |
| C-4 | 2.02 | 2.03 | 4-5 | " | " |
| C-5 | 2.05 | 2.00 | 4-5 | " | " |
| C-6 | 2.22 | 2.07 | 4-5 | " | " |
| C-7 | 2.18 | 2.11 | 4-5 | " | " |
| C-8 | 2.35 | 2.22 | 3-4 | " | Good |
| C-9 | 2.41 | 2.25 | 3 | " | " |
| C-10 | 2.16 | 1.98 | 3 | " | " |
| C-11 | 2.35 | 2.20 | 3 | Good | " |
| C-12 | 2.42 | 2.25 | 3 | " | " |
| D-1 | 2.41 | 2.33 | 4 | Excellent | Excellent |
| D-2 | 2.38 | 2.27 | 4-5 | " | " |
| D-3 | 2.35 | 2.22 | 4-5 | " | " |
| D-4 | 2.43 | 2.37 | 4-5 | " | " |
| D-5 | 2.40 | 2.33 | 4 | " | " |

COMPARATIVE EXAMPLES C-1, C-2 AND C-3

Heat-transfer sheets were prepared as in Example C-1 except for the use of the resins obtained in the above Comparative Examples A-1, A-2 and A-3 as the binder, and printing characteristics and storabilities were examined. The results are shown in Table 5.

TABLE 5

| Comparative Example | Printing density Before storage | Printing density After storage | Staining degree (Gray scale for JIS staining fastness test) | Appearance Before storage | Appearance After storage |
|---|---|---|---|---|---|
| 1 | 2.35 | 1.64 | 2 | Excellent | Dye precipitated |
| 2 | 2.23 | 1.72 | 2 | " | Dye precipitated |
| 3 | 2.17 | 1.87 | 1.2 | " | Dye precipitated |

As is apparent from the results of the above Examples, since the heat transfer sheet of the present invention uses a specific polyvinyl acetacetal resin as the binder component constituting the heat transfer layer, it has excellent image quality and storability, and dramatically improved effects can be obtained particularly in storability for a long term.

Also, in the production of the polyvinyl acetacetal resin of the present invention, since the reaction temperature and the constant temperature maintaining conditions are controlled in the presence of a constant amount of the catalyst, a polyvinyl acetacetal resin of high acetalation degree can be obtained. This resin is free from huge particles, and with little deviation in particle size and without coloration. Therefore, it can be easily purified. Further, solvent solubility is good, and it is also soluble in a non-alcoholic solvent (e.g., methyl ethyl ketone). In the manufacturing steps, aldehyde will not be volatilized, whereby no problem of environmental pollution can arise.

As a result, the polyvinyl acetacetal resin obtained by the process of the prevent invention is useful as a heat-resistant resin which is highly suitable as a binder component added in the ink composition for the heat transfer sheet of the invention.

What is claimed is:

1. A process for producing a polyvinyl acetacetal resin, sequentially comprising the steps of:

initiating precipitation of an acetalated product by maintaining an emulsifier-free reaction system comprising a polyvinyl alcohol and acetaldehyde in an aqueous phase in the presence of 4–10% by weight of an acid catalyst in a first temperature range of 8°–17° C. for at least 30 minutes; and maintaining the reaction system in a second temperature range of 25°–40° C. to obtain the polyvinyl acetacetal resin.

2. The process of claim 1, wherein said acid catalyst comprises at least one acid selected from the group consisting of hydrochloric acid, sulfuric acid, and nitric acid.

3. The process of claim 1, wherein said acetaldehyde is provided for the reaction in a proportion of 0.7 to 2.2 mols per 2 mols of said polyvinyl alcohol.

4. The process of claim 1, wherein the acetalation degree of said polyvinyl acetacetal resin is 60 mol % or higher.

5. The process of claim 1, wherein the acetalation degree of said polyvinyl acetacetal resin is 65 mol % or higher.

6. The process of claim 1, wherein the acetalation degree of said polyvinyl acetacetal resin is 70 mol % or higher.

* * * * *